United States Patent [19]

Conrotto et al.

[11] 4,020,924

[45] May 3, 1977

[54] WINDOW STRUCTURE FOR OPTICAL CODE READING SCANNERS

[75] Inventors: Paul A. Conrotto, San Jose; Henry W. Jones, San Leandro, both of Calif.

[73] Assignee: Spectra-Physics, Inc., Mountain View, Calif.

[22] Filed: Nov. 3, 1975

[21] Appl. No.: 628,326

[52] U.S. Cl. .......................... 186/1 A; 235/61.11 E
[51] Int. Cl.² .............................................. E04H 3/04
[58] Field of Search .......... 186/1 R, 1 A; 250/355, 250/366, 202; 312/223, 290; 235/61.11 E

[56] References Cited

UNITED STATES PATENTS

| 3,414,731 | 12/1968 | Sperry | 250/202 |
| 3,663,800 | 5/1972 | Myer | 235/61.11 E |
| 3,916,158 | 10/1975 | Sansone | 235/61.11 E |

Primary Examiner—Trygve M. Blix
Assistant Examiner—Reinhard J. Eisenzope
Attorney, Agent, or Firm—Flehr, Hohbach, Test, Albritton & Herbert

[57] ABSTRACT

Window structure in which the aperture incorporated in package slide is left open, the scanning window being recessed below and to one side of the aperture, making a substantial angle with the plane of the slide and located to join at one edge of the aperture. A removable receptacle located with debris catching portions below the scanning window can be provided for ease of cleaning.

10 Claims, 2 Drawing Figures

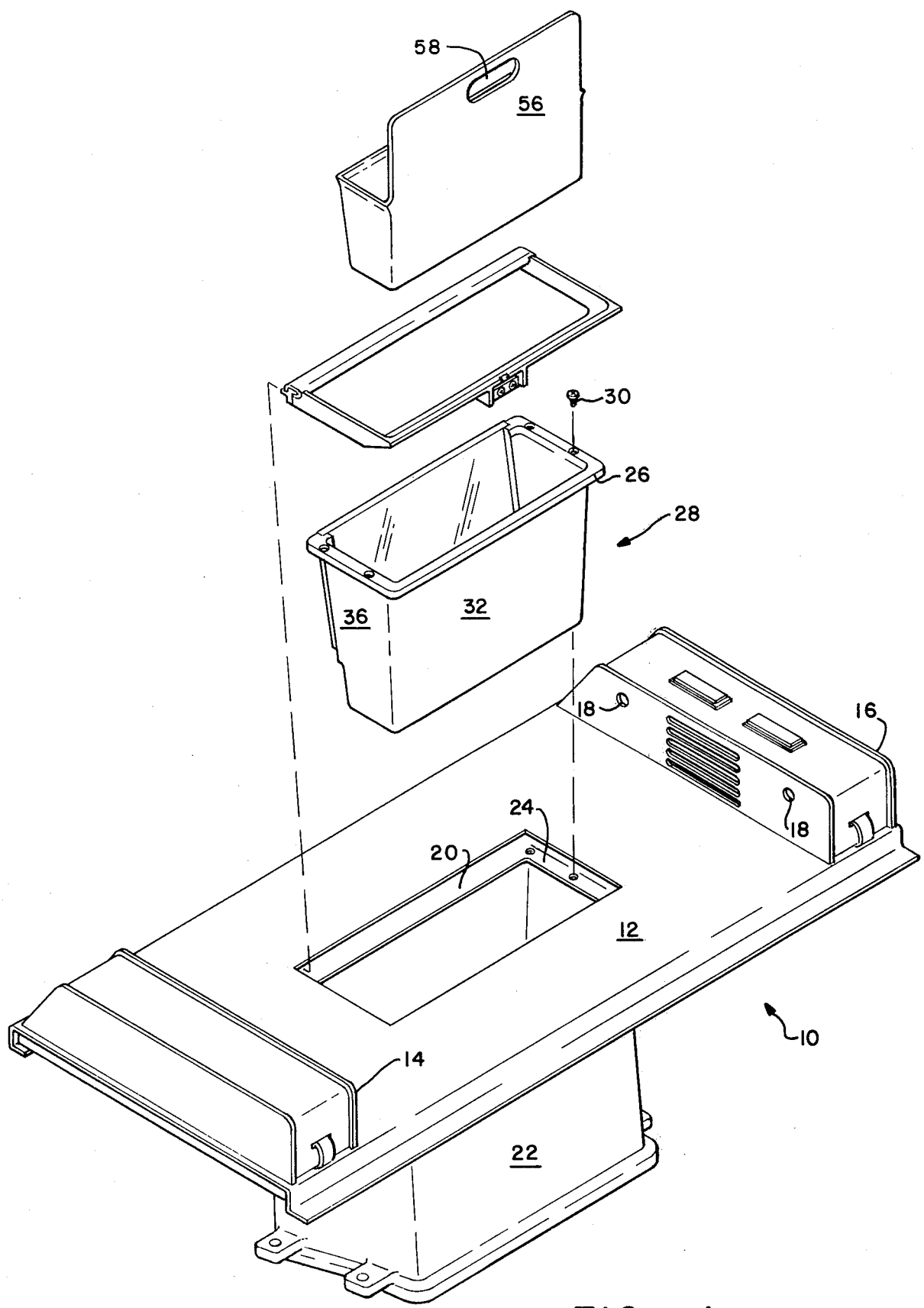
FIG.—1

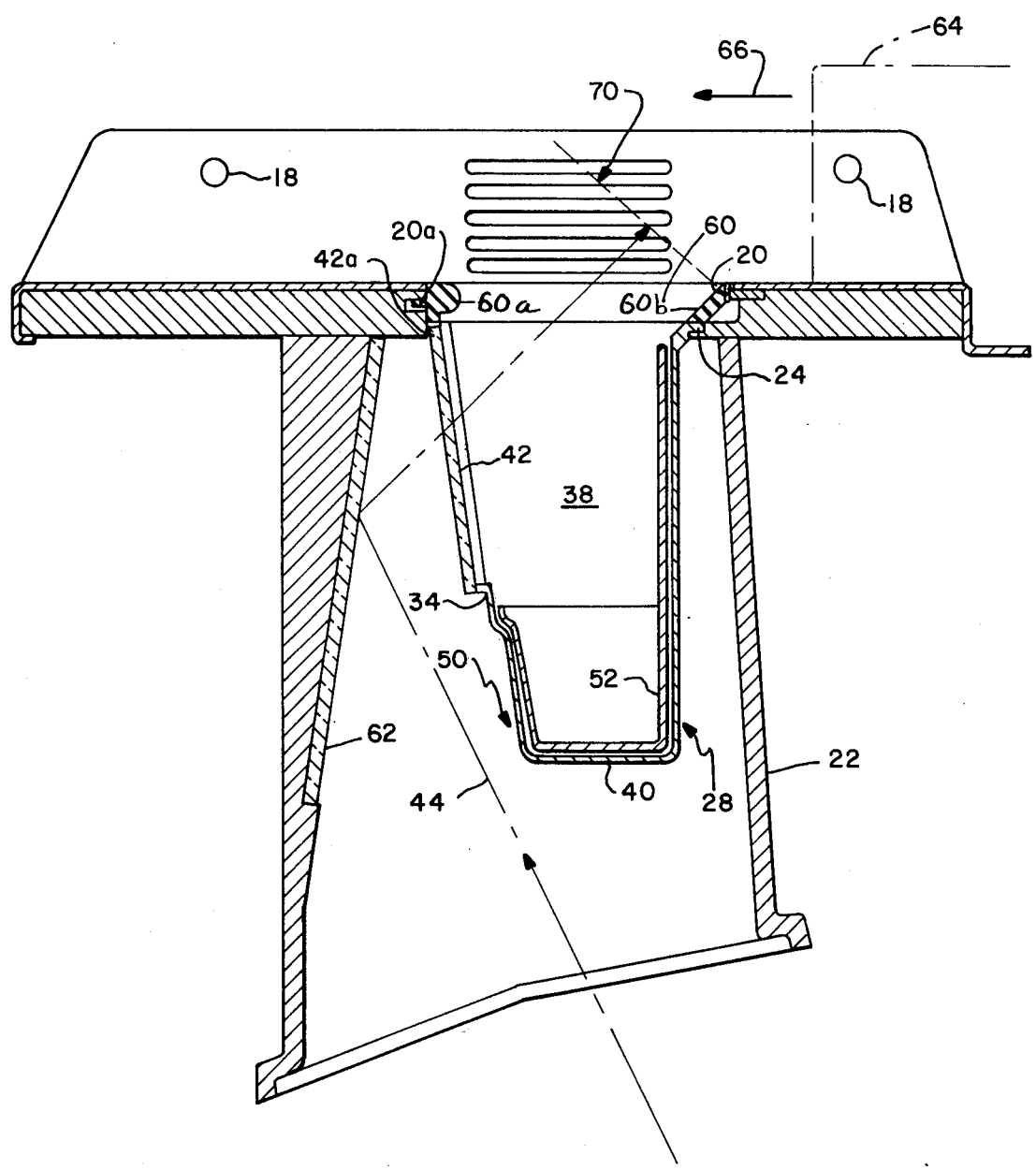
FIG.—2

WINDOW STRUCTURE FOR OPTICAL CODE READING SCANNERS

BACKGROUND OF THE INVENTION

This invention relates to an improved window structure for optical scanners, particularly the type of optical scanners having a horizontal slide having an aperture over which packages are passed through which optical scanning of the packages or articles takes place. Such scanners are now finding use in reading grocery packages having the UPC (Universal Product Code) imprinted thereon.

Such optical scaners scan the surfaces of articles of merchandise, such as groceries, for a code which can be optically read. In the grocery industry, a UPC code has now been adopted for standardizing the type of optically responsive elements incorporated on each package which will identify the product, manufacturer and quantity. As the package is moved along the checkout slide, it encounters a window formed in the slide's upper surface through which a light beam, for example a laser beam, is projected upon the package, the reflection being retrodirectively viewed and sensed. As the code on the package is scanned the reflectivity varies in intensity. Subsequently the reflective characteristic is developed into a series of digital pulses of varying width and spacing which can be decoded by a suitably programmed computer to provide both price and identification data with respect to the article. An example of the foregoing kind of equipment is shown in U.S. patent application Ser. No. 466,803 filed May 3, 1974, now abandoned, now Ser. No. 677,865 filed Apr. 19, 1976, entitled "Method and Apparatus for Reading Coding Labels", by Alfred P. Hildebrand, et al, which is assigned to the same assignee as the present application.

Such apparatus has commonly used a glass plate as a horizontal window located in the plane of the slide through which the scanning laser beam passes. The glass transmits the laser beam from optical apparatus located below the slide and serves as a window for retrodirective viewing of the article. There has been found in the course of experimental trials of such apparatus that the window suffers considerable abrasion from articles passing thereover which cause scratches. Even minute scratches tend to cause splaying of the laser beam on transmission. When scratches are sufficiently deep the integrity of the laser beam is destroyed to such a degree that reliable code reading becomes difficult, i.e., the number of erroneous readings or non-reads increases to an unacceptable level. Attempts to solve this problem directly by providing a window having a hard coated surface have been unsuccessful even though minor scratches are avoided, because certain articles which pass the window have sufficient hardness to cause a scratch in the surface coating applied to the glass. Such a scratch is unfortunately of a somewhat different character in that it tends to break and flake away portions of the coating in the adjacent area of the scratch, thus making the resultant mark far more pronounced and objectionable.

In addition, horizontally mounted windows are constantly becoming soiled because of contact with powdery and liquid substances which adhere to the window and also cause objectionable dispersion or absorption of the laser beam.

SUMMARY OF THE INVENTION AND OBJECTS

There is, therefore, a need for a new and improved window structure which will serve to physically isolate the laser scanning optics located below the slide but nevertheless be substantially insensitive to scratching and accumulation of food deposits which cause deterioration of the performance of the scanning system.

In general, it is an object of the present invention to provide a slide window structure for optical code reading scanners which will overcome the above limitations and disadvantages.

It is a further object of the invention to provide a window structure of the above character which is virtually impossible to scratch and which is substantially insensitive to powdery, liquid or other food substances being deposited thereon.

A further object of the invention is to provide an improved window structure of the above character which requires cleaning relatively infrequently, but is easy to clean when required.

Another object of the invention is to provide a improved window structure of the above character which has an internal receptacle for catching food or other debris which is removable for cleaning.

The foregoing objects are achieved by a novel window structure in which the slide aperture is left open and empty, the window being recessed below and tilted downward out of the path of the package movement and falling debris. It is still found that the scanning pattern can be transmitted through the window by reflective optics located within the structure. A conveniently removable debris receptacle can be provided in a recess below the window.

These and other objects of the invention will become apparent from the following description and claims when taken in conjunction with the accompanying drawings of which:

BRIEF DESCRIPTION OF THE DRAWINGS

FIG. 1 is an exploded isometric view of an improved window structure constructed in accordance with the present invention;

FIG. 2 is a cross-sectional view of the window structure of FIG. 1 showing the same assembled.

DESCRIPTION OF THE PREFERRED EMBODIMENTS

As shown in the drawings, the improved window structure consists generally of a housing 10 having a central planar portion 12 adapted to be assembled together with and to form part of a horizontal slide across which packages are transported as by being pushed or pulled by a checker, sometimes being transported up to the horizontal slide portion of the window structure shown by a suitable conveyor belt (not shown). Side rails 14, 16 are provided for confining packages to the horizontal slide portion of the window structure. The side rails can incorporate electric eye package sensing devices 18 so as to maintain a package count and for other purposes. As shown, a rectangular aperture 20 is provided in the surface of the slide portion of the window structure. The aperature 20 opens into a chimney structure 22 which provides a complete enclosure for attachment of the optical generating elements of the associated optice. An example of such optics is disclosed in detail in co-pending application Ser. No. 466,803 filed May 3, 1974, now abandoned, now Ser. No. 677,865 filed Apr. 19, 1976, referred to hereinbefore.

The portion of the housing structure surrounding the aperture is recessed and provided with a shoulder 24 lying below the plane of the slide and adapted to receive the outer perimeter lip 26 of the window assembly 28 presently to be described.

The window assembly 28 consists of an opaque box generally black in color to minimize reflections and being totally open at its upper end so as to conform with the aperture 20 of the housing. The upper end is provided with an outwardly projecting lip 26 thereabout which rests above and upon the shoulder 24 within the recess located in the housing and is supported thereon as by being attached thereto by suitable screws 30, one of which is shown for purposes of illustration in FIG. 1. The box is provided with front wall 32, rear wall 34, side walls 36, 38 and a bottom wall 40. The rear wall of the box is provided with a substantially vertical glass plate window 42 through which the laser beam 44 passes on route to the aperture and through which retrodirective viewing of the aperture takes place. The window is located so that its upper edge terminates near one edge 20a of the aperture. The window is large enough so as to be adequate to transmit an entire scan pattern, as for example, the scan pattern set forth in the referenced co-pending application Ser. No. 466,803, filed May 3, 1974, now abandoned, now Ser. No. 677,865 filed Apr. 19, 1976. The box is provided with a further development at its lower end 50 which forms a recess which lies below the lowermost edge of the window 42 and which serves to receive any debris or foreign matter falling into the chimney structure.

For convenience of cleaning, a removable receptacle 52 which closely interfits within the box is provided. The receptacle may be removed and washed as though it were a dish and returned or replaced entirely, as though disposable, as convenience dictates. The receptacle 52 consists of a box-like structure having closed bottom, back side and front walls, all non-reflecting. It also may most conveniently be provided with an upstanding, extended portion 56 of the back wall having a finger-grip opening 58 therein for permitting easy withdrawal of the same from the window structure. Preferably, all of the surfaces within the window structure are provided with a non-reflective black surface.

The upper periphery of the aperture structure is closed with an easily removable aperture surround 60 which serves to keep debris out of the region of the seal between the window housing and the periphery of the housing aperture. Preferably, the surround is provided with beveled surfaces having inwardly facing, smooth edges so that the checker can reach into the window housing and withdraw any item that has fallen there without risk of abrasion by the structure.

In particular, the surround 60 has a resilient, rounded back edge 60a which has a cushioning effect upon being struck so as to minimize damage to passing articles and to keep noise of operation low. The opposite surface 60b is contoured to match up in line with the upper edge of 61 of the box 28. In this way, all sides of the surround present inwardly facing smooth surfaces which not only make for easy, safe access, but also minimize the amount of debris which could lodge in that area.

Referring now more particularly to FIG. 2, the relationship of the improved window structure of the present invention to the scanning laser beam 44 is shown in detail. Thus, the laser beam 44 is brought in at an angle and reflected off a scanning mirror 62 located within the chimney. The location of the scanning mirror, its relationship to the slide window 42 and aperture 20, and the manner in which a scanning beam is developed having the geometry shown is set forth in the referenced co-pending application Ser. No. 466,803 filed May 3, 1974, now abandoned, now Ser. No. 677,865 filed Apr. 19, 1976. It is seen that the scanning beam is developed in such a way that it has the forward-looking properties with respect to a package 64 moving in the direction of arrow 66 and a scan plane 70 located out of the horizontal plane of the slide aperture.

As will become apparent, the window 42 of the present invention is substantially vertical with respect to the aperture 20. This appears to represent an optimum choice since by withdrawing the window away from the plane of the slide, scratches are completely eliminated. Further, by positioning the window at this orientation, it is possible to eliminate most of the contamination by foods and other materials which may fall through the scanning aperture. Thus, the invention can be generally characterized as associated with an optical scanning device having means for projecting a scanning beam pattern upwardly and preferably in a direction facing toward the direction from which articles arrive along the planar side of the checkout counter. The window housing is sealably attached below the aperture in the slide and serves to isolate the optical and electronic elements therebelow from contamination from matter at the slide surface. The window housing contains a window element located in one wall thereof, making a substantial angle to the plane of the slide. Assuming the slide to be horizontal, as it is in most cases or at a reference of null degrees, this angle is nearly vertical or at 80°–85°. Thus, vertical, as used herein, means an angle of preferably from about 80° to 85° with respect to the plane of the slide surface. However, angles less than 90° will still be found useful and should be regarded as within the scope of the invention, the lower limit being preferably at least greater than the angle of repose of debris likely to fall upon the window so that such debris will slide off the scanning area.

It is to be noted that both the surround 60 and the housing are removable from the top of the counter or slide without the necessity of disturbing the scanning optics and electronics located below them. This is of particular advantage in facilitating cleaning and replacement of these items at minimum expenditure of labor. In addition, by making the surround and housing, and, for that matter, the receptacle, as separate parts, the cleaning of the window and of these parts themselves can be easily accomplished by successive removal of each part in turn.

To those skilled in the art to which this invention pertains, many modifications and adaptions will become apparent. For example, while the angle of repose is given as an approximate preferable lower limit of the angle the window makes to the slide, it would be considered well within the scope of this invention to recess the mirrow below the slide at a shallower angle up to about 45°, such that it could be blown free of dust at least. It would also be possible to provide for additional means to clean the window, as for example by an air jet or jets, or by vacuum. Accordingly, the scope of the invention should be considered from that of the appended claims when interpreted by the particular form of the invention shown herein to illustrate the best mode of carrying out the invention.

What is claimed is:

1. A window structure for optical code reading scanners of the type having a generally horizontal slide over which articles bearing coded labels are passed, means forming an aperture in the slide, means forming a box having dimensions for fitting about said aperture and for forming sealing engagement with the same, said box being open at its upper end and closed on all other sides by walls, one of said walls having a means forming a transparent window therein for permitting transmission of a laser scan pattern therethrough, said window lying below said aperture and making an angle thereto.

2. Structure as in claim 1 in which said angle is at least greater than the angle of repose of debris likely to fall upon said window.

3. Structure as in claim 1 in which said angle is between about 80°–85°.

4. A structure as in claim 1 further in which said one wall has a further portion below said window, which, together with the other walls forms a recess for debris below the bottom of said window.

5. A structure as in claim 1 further including a removable receptacle constructed and adapted to interfit within the debris recess below said window.

6. A structure as in claim 5 in which said receptacle is provided with an upstanding handle on a side away from said window to facilitate removal of said receptacle for cleaning.

7. A structure as in claim 1 further including a yielding aperture surround disposed about at least portions of said slide aperture and extending inwardly to present smooth surfaces.

8. A structure as in claim 7 in which said surround is provided with a bumper rounded in cross-section and having an upper surface gradually relieved away from the plane of the slide and facing the side from which articles arrive to cushion and protect against bumping of articles passing thereon and for providing quieter operation.

9. A window structure as in claim 1 in which said slide and said box are constructed and arranged so that said box is removable from the slide from above, without requiring access from beneath the box.

10. A window structure for optical code reading scanners of the type having a generally horizontal slide over which articles bearing coded labels are passed, means forming an aperture in the slide, means forming a box having dimensions for fitting in said aperture, elements for supporting said box thereat, said box being open at its upper end and closed on all other sides by front, rear, side, and bottom walls, said rear wall having means forming a transparent window for transmitting a scan pattern therethrough, said window lying below said aperture and making a substantial angle thereto.

* * * * *